United States Patent
Scheid

Patent Number: 5,896,731
Date of Patent: Apr. 27, 1999

[54] SLOPE EQUALIZING ARRANGEMENT FOR A HARVESTING MACHINE

[75] Inventor: Heinrich Scheid, Blieskastel, Germany

[73] Assignee: Deere & Company, Moline, Ill.

[21] Appl. No.: 09/017,358

[22] Filed: Feb. 2, 1998

[30] Foreign Application Priority Data

Feb. 14, 1907 [DE] Germany ............................ 197 05 583

[51] Int. Cl.⁶ ............................ A01D 67/00; A01D 75/28
[52] U.S. Cl. ............................ 56/10.9; 56/208; 56/209; 56/10.2 R
[58] Field of Search ............................ 56/10.2 R, 10.2 A, 56/10.4, 10.9, 208, 209, DIG. 15; 280/6.1, 6.11, 6.12, 840

[56] References Cited

U.S. PATENT DOCUMENTS 2,753,675  7/1956  Harp ............................ 56/209
3,731,470  5/1973  Cornish et al. ............................ 56/10.4

FOREIGN PATENT DOCUMENTS 07 36 244 A2  10/1996  European Pat. Off. .
9 04 501  2/1954  Germany .
1580343  3/1970  Germany .
A1-41 31 433  4/1993  Germany .

*Primary Examiner*—Thomas B. Will
*Assistant Examiner*—Robert Pezzuto

[57] ABSTRACT

A harvesting machine with a slope equalizing arrangement having a gearbox housing that is pivotally mounted to a pivot bearing. The gearbox housing having a sleeve that is pivotally received in a bushing formed in the pivot bearing. The gearbox housing is also provided with a mandrel to which is coupled one end of a hydraulic cylinder. The other end of the hydraulic cylinder is coupled to the pivot bearing. The gearbox housing has first and second parts. The first and second parts (66, 68) are assembled at a vertical interface surface that extends in the direction of travel. The mandrel being mounted to the second part.

17 Claims, 5 Drawing Sheets

SLOPE EQUALIZING ARRANGEMENT FOR A HARVESTING MACHINE

BACKGROUND OF THE INVENTION

1. Field of the Invention

The invention is directed to a harvesting machine with a slope equalizing arrangement having a pivot bearing, a gearbox housing and a hydraulic cylinder.

2. Description of the Prior Art

DE-A1-41 31 433 discloses a slope equalizing arrangement for a combine. This arrangement contains a mount attached to the combine frame and a pivot arm. The pivot arm supports a final drive housing that can pivot vertically on bearings in the mount. The pivot arm contains a first leg that is bolted to the final drive housing and a second leg configured as a sleeve that is retained in the mount and is free to rotate. A journal extends from the leg connected to the final drive housing and is used for the connection to a hydraulic cylinder. The hydraulic cylinder extends substantially in horizontal direction between the pivot arm and the mount and vertically pivots the pivot arm with the final drive housing. The final drive housing consists of a cast housing and a cover that can be connected to each other at a interface surface that extends transverse to the direction of travel of the vehicle. One leg of the pivot arm is bolted to the cast housing.

In another configuration a two-piece gearbox housing is used, in which the interface surface extends in the direction of travel. The pivot arm is bolted to the part that faces the center of the vehicle. In this embodiment the wheel hub is supported in bearings and is free to rotate in both parts of the gearbox housing.

SUMMARY

It is one of the objects of the present invention to provide a slope equalizing arrangement that is easy to manufacture.

In the present invention the pivot arm can be omitted and the sleeve as well as the mandrel can be integrated into the gearbox housing. The use of a gearbox housing with a vertical or generally vertical interface surface extending in the direction of travel makes it possible to configure the part facing the frame of the vehicle in such a way that it can be manufactured with current casting or forging techniques. This is despite the connection to the sleeve and, if necessary also with the mandrel. The gearbox housing consists generally of a large, deep cast housing, as shown in DE-A1-41 31 433, the non-positive lock is too indeterminate to consider casting, forging or bolting the pivot bearing and the mandrel with present manufacturing technology. In the most favorable case the particular part of the gearbox housing may be configured as a plate or bell, if necessary with reinforcing ribs, which may even be produced by a forging process. A less favorable, but still possible configuration is seen in that the sleeve is supported in bearings and is free to rotate, not in a bushing, but on a shaft. The position of the hydraulic cylinder that is more vertical than horizontal resulting from the location of the hydraulic cylinder generally within the vertical extent of the pivot bearing, makes it possible to attach the pivot bearing below the frame of the harvesting machine, whereby the width of its installation is kept small.

If the sleeve and/or the mandrel is/are not connected as a one-piece unit with the second part, but are bolted or otherwise attached to it, the second part may be produced even more simply. In this installation the connecting region of the sleeve and/or the mandrel is provided with corresponding reinforcing material, such as beads, collars, which assure a favorable force transmission.

Durable positioning of the sleeve in the second part is assured by a blind bore and screws, which retain the sleeve.

Depending on the strength requirements to be expected and the machine tools available, the sleeve and, if necessary, the mandrel may also be directly cast or forged as a unit with the second part, so as to create a uniform component with continuous lines of force transmission.

If the input shaft is supported in bearings in a region of the second part projecting beyond the first part, particularly if double bearings are used, a different gearbox housing can be created merely by the exchange of each second part and hence the reduction gear ratio as well as the offset between the centerlines of the input and the output shafts, which is significant for the amount of pivoting, can be varied without thereby affecting the first part.

The resistance to leakage and the strength of the second part of the gearbox housing are preserved to an even greater degree if the mandrel that engages the hydraulic cylinder is accommodated in a wall region of the second part, which extends beyond the first part and thereby does not compromise its strength.

DETAILED DESCRIPTION

Figure 1:
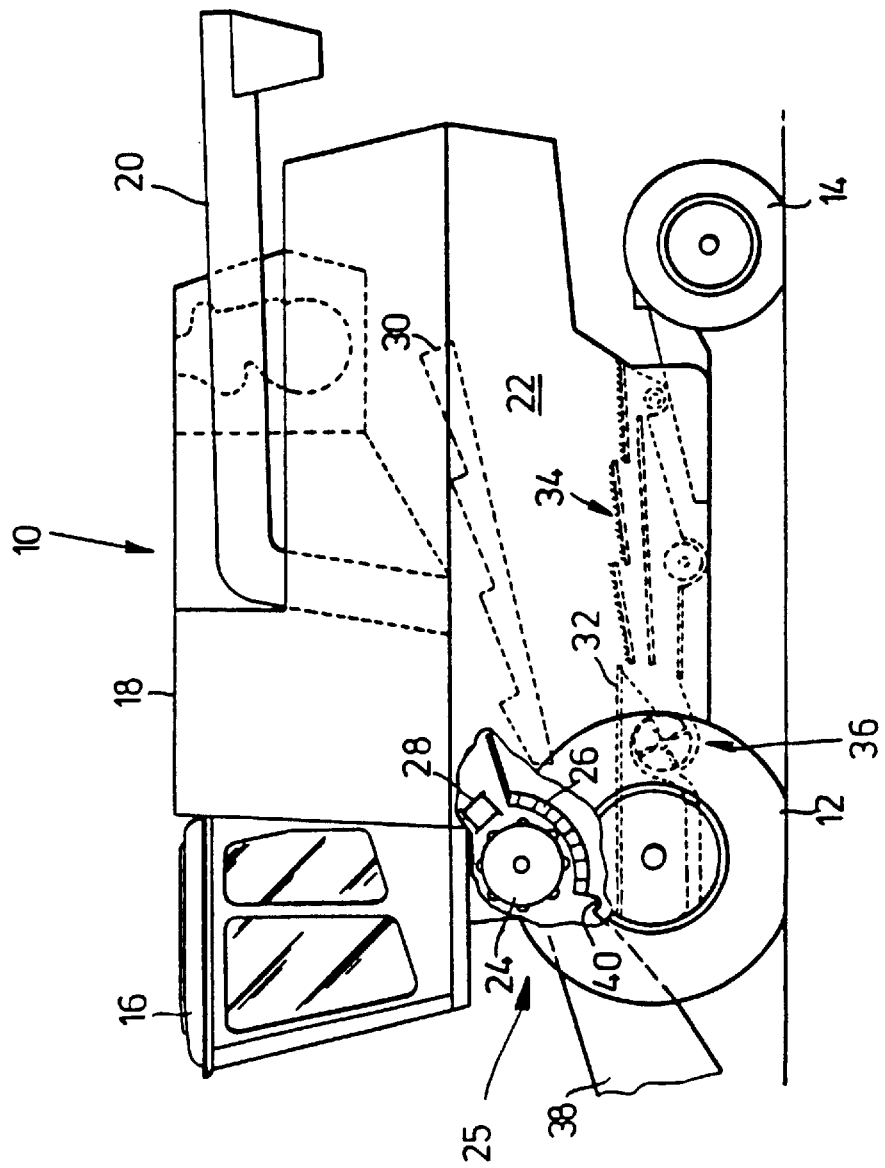
FIG. 1 shows a side view of a harvesting machine.

A harvesting machine 10 in the form of a combine shown in FIG. 1 is supported on forward driven and rear steerable wheels 12, 14, respectively. The machine 10 is provided with an operator's cab 16 from which it can be controlled by an operator. Although the present invention is illustrated as being used on a combine it can also be used a self-propelled forage harvester, a self-propelled potato harvester, a swath-forming mower or the like. A grain tank 18 is located behind the operator's cab 16. An unloading auger 20 is used to discharge grain from the grain tank 18. The grain tank 18 is supported on a frame 22. Harvested crop is directed to a feederhouse 38 by a harvesting assembly, not shown. The harvested crop is directed by the feederhouse 38 to a threshing assembly 25 comprising a threshing cylinder 24 a concave 26 and a beater 28. The large components of the threshed crop are directed by beater 28 onto straw walkers 30. The small components of the threshed crop comprising grain and chaff fall through the concave onto grain pan 32. Additional mall components removed from the large components by the straw walkers 30 are also directed to grain pan 32. The remaining larger components are thrown out the rear of the combine 10 by the straw walkers 30. The small components are directed by the grain pan 32 to a sieves 34 where the chaff is removed from the clean grain and blown out the rear of the combine by blower 36. The clean grain falls through the sieves and is received by a cross auger that directs the clean grain to an elevator for lifting the clean grain to the grain tank 18. A stone trap 40 is located immediately upstream from the feederhouse for receiving stones trapped in the harvested crop and removing them from the crop stream.

Figure 2:
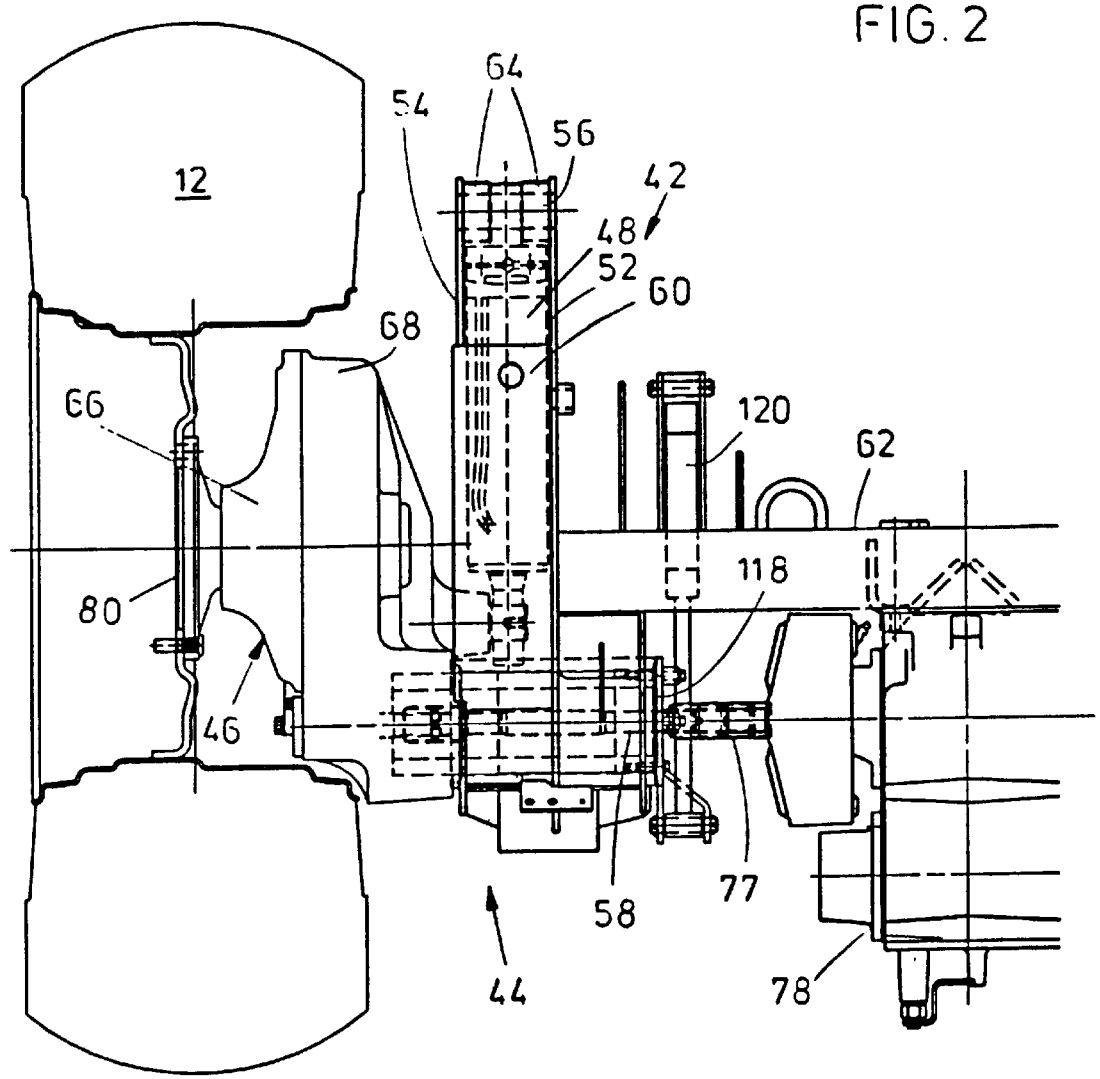
FIG. 2 shows a plan view of the slope equalizing arrangement.

FIG. 2 shows a section of the harvesting machine 10 with a slope equalizing arrangement 42. The arrangement 42 comprises a pivot bearing 44, in which a gearbox housing 46 is supported in bearings and is free to pivot vertically. The pivoting movement is performed by means of a hydraulic cylinder 48.

The slope equalizing arrangement 42 is provided on each side of the harvesting machine 10. The arrangement is used to level the combine during operation on a slope, or upon an uneven distribution of the crop on the sieves 34, or to adjust it in such a way that the crop is distributed evenly on the sieves 34. The drawing shows only the left slope equalizing arrangement 42. The operation of the slope equalizing arrangement 42 is performed by a control or regulating arrangement, not shown, that generates a signal from the inclination of the harvesting machine 10 or the uneven distribution of the crop. This signal is used to extend or retract the hydraulic cylinder 48. A further component of the slope equalizing arrangement 42 that is not shown, is a pivoting arrangement for the harvesting assembly, for example, a cutting head, a corn cutter or a corn picker which is maintained parallel to the ground.

In this embodiment the pivot bearing 44 is formed by an inner wall 52 and an outer wall 54 which are spaced apart and extend parallel to each other in the vertical direction. The walls 52, 54 are connected to each other in their forward region, located at the top in FIG. 2, by means of a pin 56. The walls 52, 54 are connected to each other in their rear region, at the bottom in FIG. 2, by means of a bushing 58. The walls 52, 54 are connected to each other in their upper region by means of a plate 60. The space formed between the walls 52 and 54 is large enough to accommodate the hydraulic cylinder 48. In its lower region the pivot bearing 44 is open, so that the hydraulic cylinder 48 can move vertically between the two walls 52 and 54 and can extend downward to a limited degree. The inner wall 52 of pivot bearing 44 is welded to an axle housing 62 of the harvesting machine 10. Alternatively, the pivot bearing 44 may be fastened directly to the frame 22. Finally, the pivot bearing 44 may be configured to be interchangeable by itself or together with the axle housing 62, so that the slope equalized harvesting machine 10 can be converted to one that can only be operated on level ground. In this respect reference is specifically made to the arrangement disclosed in WO-A1-9305640, which is hereby included as reference.

The pin 56 extends through corresponding openings in the side walls 52 and 54 and is secured in its position there by conventional means. In the region of the openings, the walls 52 and 54 may be provided with reinforcements or spacers 64 which receive pin 56. An intervening space is formed between the reinforcements or spacers 64 so that the second end of the hydraulic cylinder 48 can engage the pin 56. In addition the hydraulic cylinder 48 is free to rotate on pin 56. The longitudinal centerline of the pin 56 is transverse to the direction of travel of the harvesting machine 10. If a ball joint is used instead of the pin 56, the ball joint must be oriented or arranged in such a way that the hydraulic cylinder 48 can pivot in the same manner.

The bushing 58 also penetrates both walls 52, 54 in appropriate openings and is welded to the walls. The bushing 58 is designed as a sliding bearing and has an inside diameter of approximately 200 mm. Alternatively the bushing 58 may also be designed to accommodate ball bearings or other rolling contact bearings and/or may be bolted to the walls 52, 54. The bushing 58 may project beyond the one or the other side of the walls 52, 54 or beyond both sides, or it may end with shoulders at these locations. The longitudinal centerline of the bushing 58 extends perpendicular to the walls 52, 54 transverse to the direction of travel of the harvesting machine 10.

The plate 60 forms a welded connection of both walls 52, 54 and may also be used for a connection to the frame 22 of the harvesting machine 10. It is adequate if the plate only extends over a partial length of the walls 52, 54.

Figure 4:
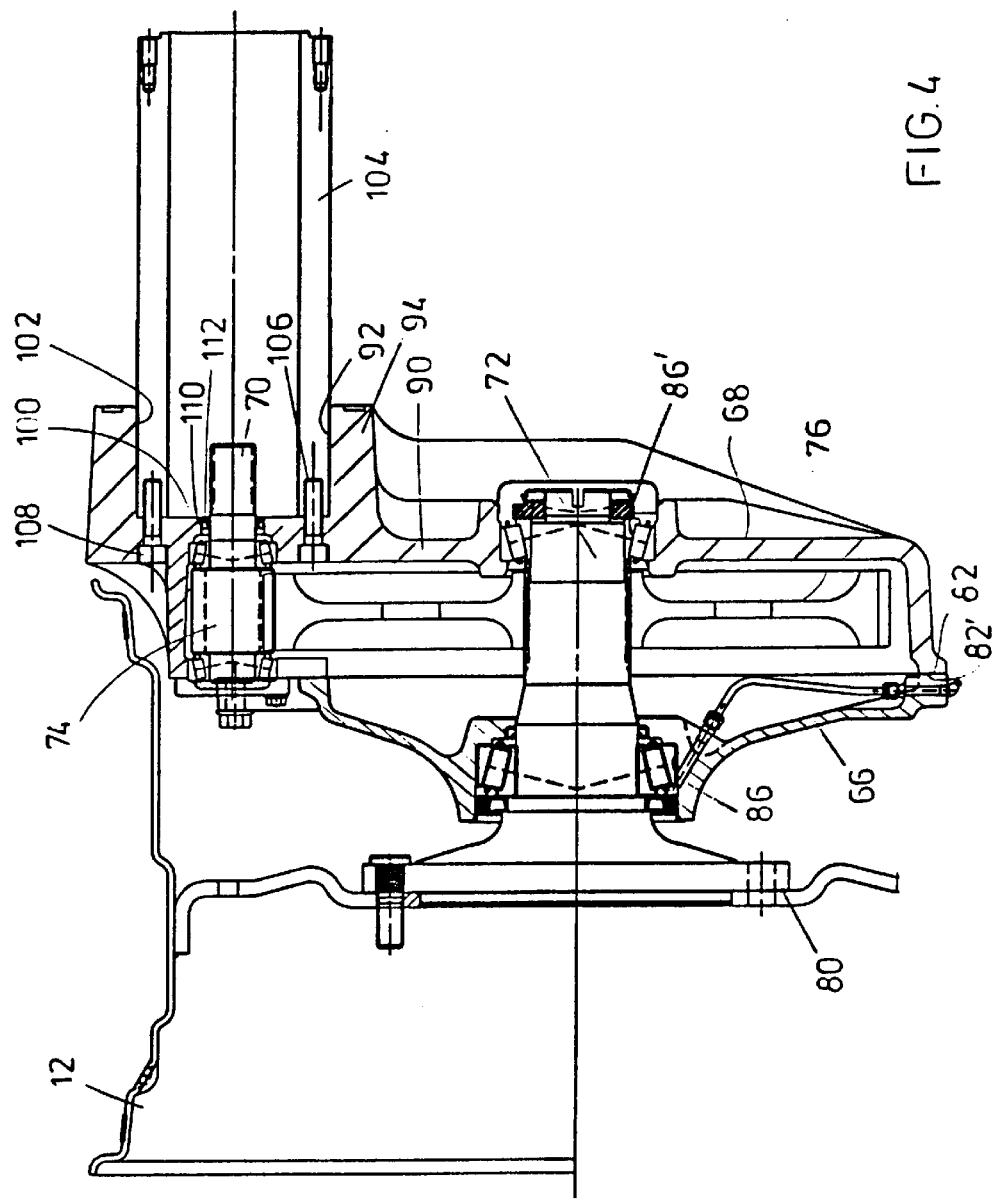
FIG. 4 shows a longitudinal section through the gearbox housing.

The gearbox housing 46 is composed of a first outboard part 66 and a second inboard part 68, which are bolted to each other along a vertical interface surface which extends in the direction of travel. The gearbox housing 46 encloses a reduction gearset consisting of spur gears or a planetary gearset. As can be seen in FIG. 4, the gearset includes an input shaft 70 and an output shaft 72. A small pinion 74 is fastened to the input shaft 70. A large gear 76 is fastened to the output shaft 72. The pinion 74 and the large gear 76 mesh with each other and produce a reduction in rotational speed. In this embodiment the axes of rotation of the input and output shafts 70 and 72 are parallel to each other. The input and output shafts 70 and 72 are supported in tapered roller bearings. The input shaft 70 is rotatively supported in only the second part 68. The output shaft 72 is rotatively supported in both the first and the second parts 66 and 68. The input shaft 70 is connected through a shaft 77 with a gearbox 78 that provides driving power. The output shaft 72 contains a flange 80 that can be bolted to a wheel 12. Accordingly, the wheel 12 is driven by an engine, illustrated in phantom lines in FIG. 1. Power from the engine is directed through the gearbox 78 to the shaft 77, from shaft 77 to the input shaft 70, from input shaft 70 to the pinion 74, from the pinion 74 to the gear 76, from the gear 76 to the output shaft 72, and from the output shaft 72 to the wheel 12 by way of flange 80.

According to FIG. 4, the first part 66 is configured as a dish or a bowl with its outboard end having a bearing receiving bore 86 for receiving the bearing housing of the output shaft 72 and an inboard end forming a circular flange 82 for attachment to the second part 68.

Figure 3:
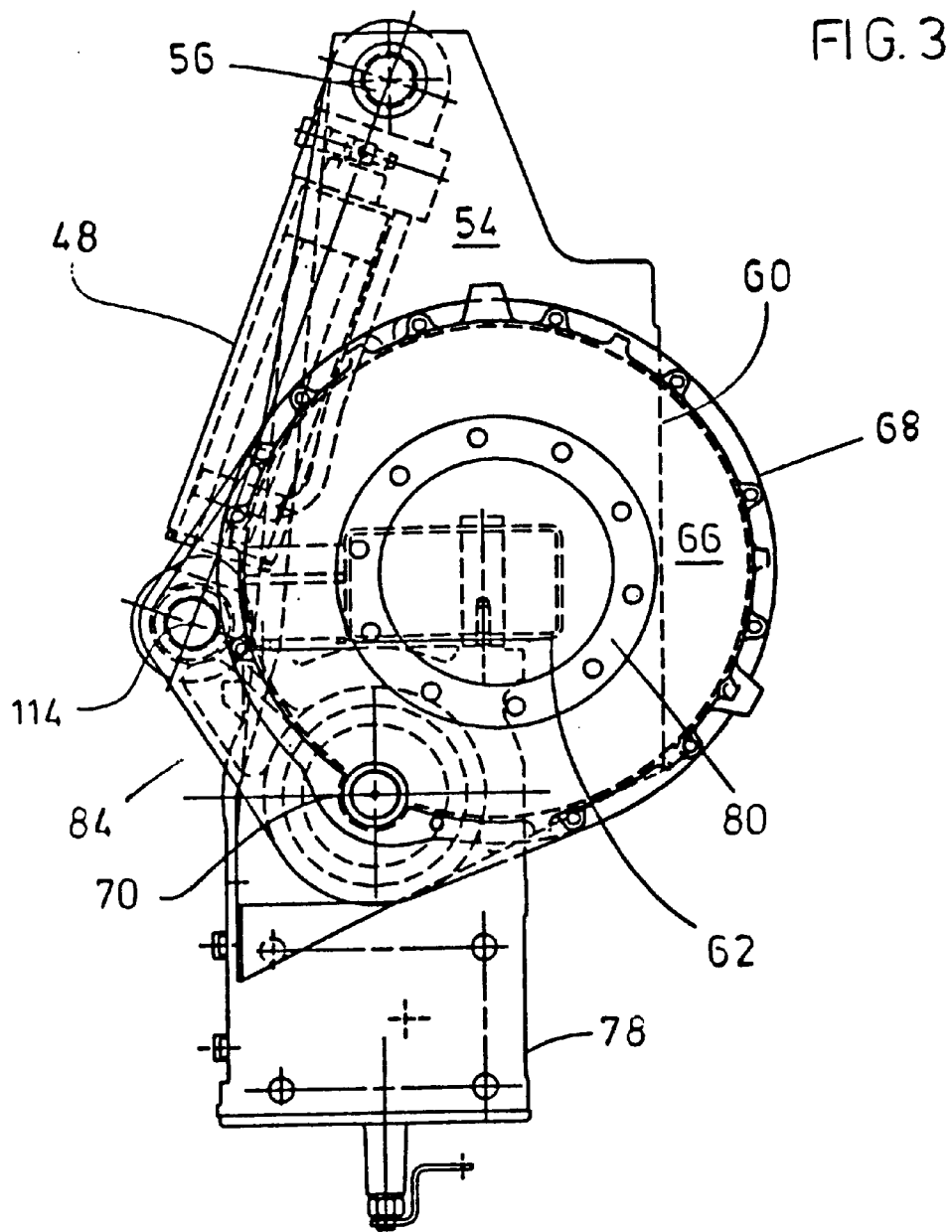
FIG. 3 shows a side view of the slope equalizing arrangement.
Figure 5:
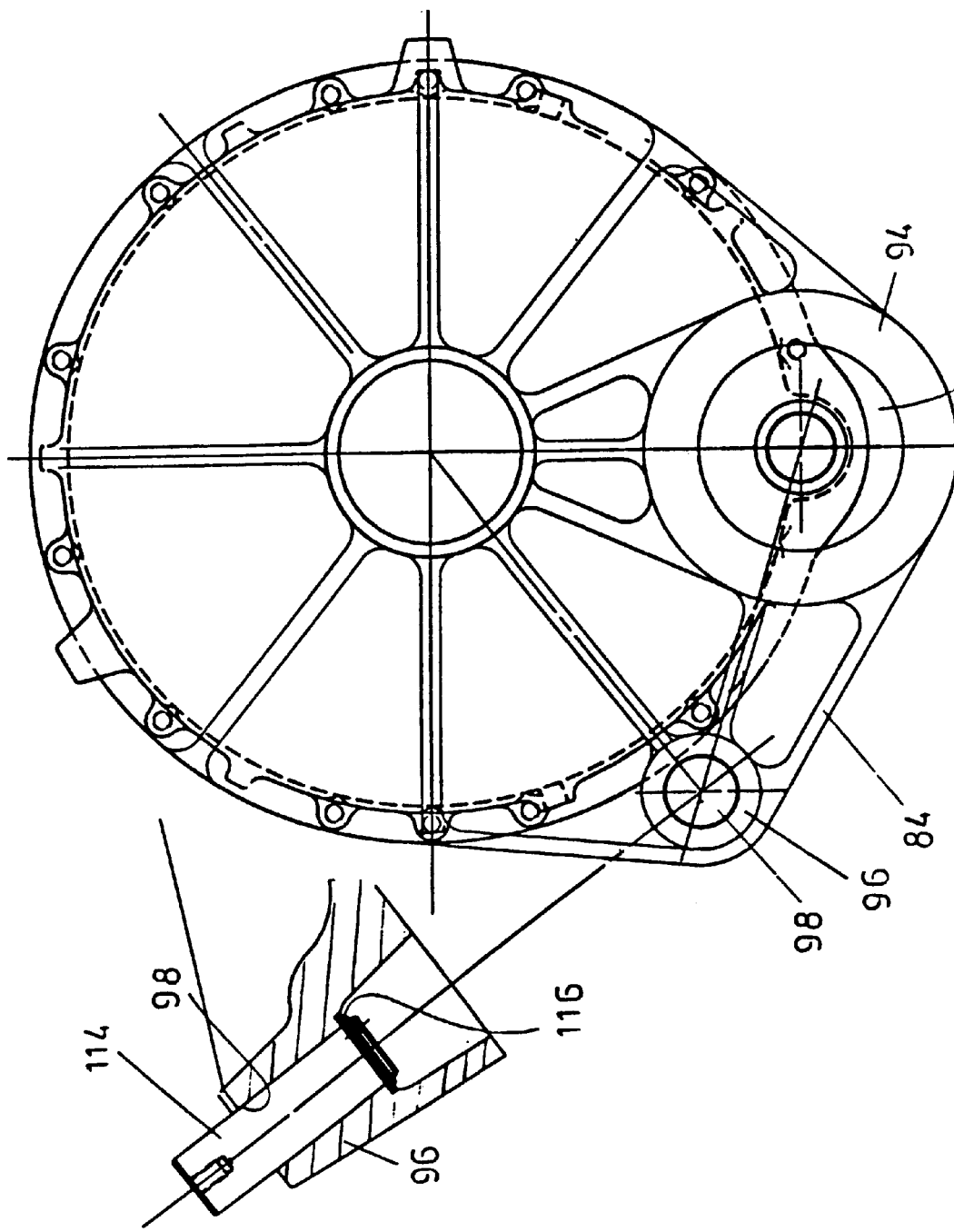
FIG. 5 shows a side view of the gearbox housing of FIG. 4.

As seen in FIG. 5, the second part 68 is generally circular in the front view and configured as a pot. The lower region of the second part as seen in FIGS. 3 and 5 is provided with a projection 84 which is integrally formed with the second part by either casting or forging. This projection 84 projects beyond the circular surface. At the left end as seen in FIG. 4, the second part 68 ends in a circular flange 82' that is configured so that it can be bolted and sealed to the circular flange 82 of the first part 66. Approximately at the center of the second part 68 a bearing receiving bore 86' is provided for receiving the right or inner bearing of the output shaft 72. When in its assembled condition bearing receiving bore 86 of the first part and bearing receiving bore 86' of the second part are arranged coaxially, which is the axis of rotation of the output shaft 72. The second part 68 extends between the circular flange 82' and the wall 90 which contains the bearing receiving bore 86' and which is reinforced with ridges and ribs, not shown. The width of this part corresponds essentially to the width of the gear 76 and is therefore relatively small.

The projection 84 that extends tangentially from two places on the circumference of the wall 90 occupies an approximate trapezoidal shape. In this region, a first recess 92, in the form of a blind bore with a collar 94, and a cast eye 96, with a second recess 98 in the form of a bore, are provided.

The projection 84 and the wall 90 are configured as a one-piece casting or forging. This is possible only due to the open pot shape with small axial width and without or essentially without undercuts.

The recess 92 is provided in the region of the greatest wall thickness of the second part 68, and contains a bottom 100 and an inner wall 102, each of which provides a stop and an enclosure for a sleeve 104. The recess 92 is dimensioned in such a way that the sleeve 104 is retained with a fit that is sufficiently tight to overcome bending and without any clearance. Threaded bores 106 are provided in the sleeve 104 extending from the end face that engages the recess 92 for the retention of the sleeve 104, into which screws 108 can be screwed which penetrate the wall 90 in the rim region of the bottom 100. Alternatively the sleeve 104 may also be retained in a friction lock connection in the recess 92 or may be welded in place. The bottom 100 contains a bore 110 through which the input shaft 70 extends into the recess 92 and which contains a seal 112 which prevents the passage of lubricant contained in the gearbox housing 46. The longitudinal centerline of the recess 92, the sleeve 104, the input shaft 70 and their bearings as well as the bore 110 is the same, that is, these components are arranged coaxial to each other. The bearing support of the input shaft 70 and the accommodation of the pinion 74 are solved in such a way that the projection 84 contains a core in the case of a casting, while this region remains as solid material in the case of a forging, into which a niche is milled. According to another version which is shown, a plate is bolted opposite the wall 90 that supports the input shaft 70 at one end.

In another corner region of the projection 84, specifically offset by approximately 50 degrees as seen in FIG. 5, the cast eye 96 with the recess 98 is located outside the circular surface, while the collar 94 is cut essentially at its center by the circle. The recess 98 in the cast eye 96 is used to engage a mandrel 114 and to retain it in a fixed position. In the embodiment shown the mandrel 114 projects with approximately one-third of its length beyond the cast eye 96 and is retained axially in the cast eye 96 by means of a retaining ring 116. In addition the mandrel 114 can be applied with a press fit and retained with a friction lock. The centerline of the mandrel 114 is located at the greatest distance to the center of the second part 68 and thereby to the axis of rotation of the output shaft 72. This mandrel engages the first end or piston rod end of the hydraulic cylinder 48 and hence extends in the direction of the sleeve 104 up to the space between the inner and the outer walls 52 and 54 of the pivot bearing 44. The mandrel 114 can also be formed as an integral unit with the second part 68.

The sleeve 104 engages the bushing 58 of the pivot bearing 44 and thereby represents the second part of the sliding bearing. The outside diameter of the sleeve 104 and the inside diameter of the bushing 58 are selected in such a way that a relatively small clearance remains for a sliding fit. It is also possible to insert bearing bushings of bearing material between the two components to improve the sliding property. In a version that is simple to manufacture and is shown here the sleeve 104 is provided with a constant inside and outside diameter over its entire length, that is, the inside diameter of the recess 92 corresponds essentially to that of the bushing 58, where the tolerances of the press fit and the sliding fit are neglected. The total length of the sleeve 104 is somewhat greater than the depth of the recess 92 and the length of the bushing 58. A stop plate 118 is fastened to the end region of the sleeve 104 that projects in the assembled condition, this prevents an axial movement of the sleeve 104 in the bushing 58. A slave cylinder 120 is connected in known manner to the stop plate 118, which is used to control the inclined position of the harvesting assembly. Alternatively the sleeve 104 could also be cast as a unit with the wall 90.

The hydraulic cylinder 48 is configured as a double-acting cylinder and is actuated correspondingly by the aforementioned control or regulating arrangement. The hydraulic cylinder 48 is arranged in such a way that it extends substantially in the horizontal direction. In the illustrated embodiment, the longitudinal centerlines of the pin 56 and the sleeve 104 lie in one plane which extends generally parallel to the ground or to any other support surface of the harvesting machine 10. Although it is desirable if the pivot axes of the hydraulic cylinder 48 and the sleeve 104 lie essentially in one plane, this plane may also be inclined as long as the attaching point of the hydraulic cylinder 48 to the pivot bearing 44 remains below its upper edge, which still can be attained at an inclination of approximately 45 degrees. In FIG. 2 the gearbox housing 46 occupies its upper end position, in which the hydraulic cylinder 48 is fully retracted. In this position the attaching point of the hydraulic cylinder 48 at the gearbox housing 46 is located slightly below the aforementioned plane through the pin 56 and the sleeve 104. If the hydraulic cylinder 48 is extended, this attaching point moves in a circular arc about the longitudinal centerline of the sleeve 104, which forms the pivot axis of the gearbox housing 46, so that the attaching point moves downward from this plane. As a result of this movement the gearbox housing 46 pivots downward and thereby raises the axle housing 62. The control of the hydraulic cylinder 48 is selected in such a way that the hydraulic cylinder 48 on the one side of the harvesting machine 10 retracts when the one on the other side extends, therefore the harvesting machine 10 is tilted about its longitudinal axis, so that the components contained therein, for example, sieves 34, are adjusted to a more or less horizontal position. When the hydraulic cylinder 48 is in its retracted position, the mandrel 114 or the cast eye 96 can make contact with the underside of the outer wall 54, whereby the load of the harvesting machine 10 rests entirely on the mandrel 114, while the hydraulic cylinder 48 is unloaded.

It can be seen that the gearbox housing 46 is supported by the pivot bearing 44 so as to pivot vertically around the sleeve 104, and that the pivoting path of the wheel 12 or the height offset that can be attained depends on the distance between the longitudinal centerline of the output shaft 72 and the input shaft 70. Furthermore, it is evident that a different gear reduction ratio or a different offset between the two longitudinal centerlines can be achieved solely by the exchange of the inboard second part 68 of the gearbox housing 46, since the bearing support of the input shaft 70 is provided only in the second part 68. By the same token the harvesting machine with slope equalization can be converted to a harvesting machine for operation on level ground, by attaching the second part 68 directly and rigidly to the axle housing 62, or by replacing it with a part that is designed exclusively for that purpose.

The invention should not be limited by the above described embodiment, but should be limited solely by the claims that follow:

I claim:

1. An agricultural harvesting machine having a frame and wheels supporting the frame, the frame and wheels defining a direction of travel, the agricultural harvesting machine is also provided with a slope equalizing arrangement, the slope equalizing arrangement comprising a pivot bearing, a gearbox housing and a hydraulic cylinder having first and second ends, wherein the pivot bearing is connected to the harvesting machine and is provided with a bushing whose longitudinal centerline extends transverse to the direction of travel, the gearbox housing comprises first and second parts that are connected to each other at an interface surface which extends essentially vertically and in the direction of travel, the second part of the gearbox housing faces the pivot bearing and is provided with a sleeve that can rotate in the bushing and a mandrel, the sleeve extends concentric to an input shaft that is supported in bearings in the gearbox housing and defines a bearing axis, the input shaft extends parallel to an output shaft that is connected to one of the wheels, the mandrel forms a pivot axis for the first end of the hydraulic cylinder, the pivot axis extends parallel to the bearing axis and the second end of the hydraulic cylinder is located on the pivot bearing.

2. Harvesting machine according to claim 1, characterized by the second part of the gearbox housing is provided with first and second recesses that engage the sleeve and the mandrel.

3. Harvesting machine according to claim 2, characterized by the first recess engaging the sleeve is configured as a blind bore in the second part and the sleeve is secured to this recess by means of screws.

4. Harvesting machine according to claim 1, characterized by the sleeve is integral by being cast with the second part.

5. Harvesting machine according to claim 1, characterized by the sleeve is integral by being forged onto the second part.

6. Harvesting machine according to claim 2, characterized by the sleeve is integral by being cast with the second part.

7. Harvesting machine according to claim 2, characterized by the sleeve is integral by being forged onto the second part.

8. Harvesting machine according to claim 1, characterized by the second part is provided with a projection that projects beyond the first part and in which the input shaft is supported in bearings.

9. Harvesting machine according to claim 2, characterized by the second part is provided with a projection that projects beyond the first part and in which the input shaft is supported in bearings.

10. Harvesting machine according to claim 3, characterized by the second part is provided with a projection that projects beyond the first part and in which the input shaft is supported in bearings.

11. Harvesting machine according to claim 6, characterized by the second part is provided with a projection that projects beyond the first part and in which the input shaft is supported in bearings.

12. Harvesting machine according to claim 7, characterized by the second part is provided with a projection that projects beyond the first part and in which the input shaft is supported in bearings.

13. Harvesting machine according to claim 1, characterized by the second part is provided with a projection which extends beyond the first part and in which the mandrel for the connection to the hydraulic cylinder is located.

14. Harvesting machine according to claim 2, characterized by the second part is provided with a projection which extends beyond the first part and in which the mandrel for the connection to the hydraulic cylinder is located.

15. Harvesting machine according to claim 3, characterized by the second part is provided with a projection which extends beyond the first part and in which the mandrel for the connection to the hydraulic cylinder is located.

16. Harvesting machine according to claim 6, characterized by the second part is provided with a projection which extends beyond the first part and in which the mandrel for the connection to the hydraulic cylinder is located.

17. Harvesting machine according to claim 7, characterized by the second part is provided with a projection which extends beyond the first part and in which the mandrel for the connection to the hydraulic cylinder is located.

* * * * *